US009060646B2

(12) United States Patent
Ait Bouziad et al.

(10) Patent No.: US 9,060,646 B2
(45) Date of Patent: Jun. 23, 2015

(54) MILK FROTHING WITH PRESSURIZED GAS

(75) Inventors: Youcef Ait Bouziad, Saint-Sulpice (CH); Fabien Ludovic Agon, Blonay (CH); Alfred Yoakim, St-Legier-la Chiesaz (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/980,786

(22) PCT Filed: Dec. 7, 2011

(86) PCT No.: PCT/EP2011/072023
§ 371 (c)(1),
(2), (4) Date: Aug. 1, 2013

(87) PCT Pub. No.: WO2012/097916
PCT Pub. Date: Jul. 26, 2012

(65) Prior Publication Data
US 2013/0319259 A1 Dec. 5, 2013

(30) Foreign Application Priority Data
Jan. 21, 2011 (EP) .................................. 11151642

(51) Int. Cl.
*A47J 31/44* (2006.01)
(52) U.S. Cl.
CPC .............. *A47J 31/44* (2013.01); *A47J 31/4485* (2013.01); *A47J 31/4489* (2013.01)
(58) Field of Classification Search
CPC ............................... A47J 31/4485; A47J 31/44

USPC ........... 99/279, 295, 293, 452, 474, 569, 590; 426/474, 590; 222/3, 40, 46, 135, 190
See application file for complete search history.

(56) References Cited

U.S. PATENT DOCUMENTS

| 1,889,236 A | * | 11/1932 | Burmeister | 426/317 |
| 3,552,726 A | * | 1/1971 | Kraft | 261/50.1 |
| 3,896,716 A | * | 7/1975 | Carasso | 99/452 |
| 4,993,599 A | * | 2/1991 | Gruenewald | 222/190 |
| 5,238,155 A | * | 8/1993 | Blake, III | 222/190 |
| 5,411,177 A | * | 5/1995 | Blake, III | 222/105 |
| 5,984,280 A | * | 11/1999 | Okuda et al. | 261/28 |

(Continued)

FOREIGN PATENT DOCUMENTS

| EP | 2036471 | 3/2009 |
| EP | 2110060 | 10/2009 |

(Continued)

OTHER PUBLICATIONS

International Search For International Application No. PCT/EP2011/072023 mailed on Feb. 16, 2012.

(Continued)

*Primary Examiner* — Thien S Tran
(74) *Attorney, Agent, or Firm* — K&L Gates LLP

(57) ABSTRACT

A milk frothing device (1) delimiting an area (2) for mixing milk (35) from a milk reservoir (3) and gas (49), comprises a supply arrangement (4) of pressurized gas. The pressurized gas supply arrangement (4) has a propelling gas conduit (41) configured to deliver pressurized propelling gas (48) into the milk reservoir (3) to pressurize the reservoir and propel thereby pressurized milk (36) from the reservoir to the mixing area (2).

18 Claims, 3 Drawing Sheets

(56) References Cited

U.S. PATENT DOCUMENTS

2004/0009281 A1    1/2004  Green
2007/0175927 A1*   8/2007  Ozanne et al. ............... 222/334

FOREIGN PATENT DOCUMENTS

WO    2006122916    11/2006
WO    2008077264    7/2008

OTHER PUBLICATIONS

International Preliminary Report on Patentability for corresponding International Application No. PCT/EP2011/072023 mailed on Aug. 1, 2013.

* cited by examiner

MILK FROTHING WITH PRESSURIZED GAS

CROSS REFERENCE TO RELATED APPLICATIONS

The present application is a National Stage of International Application No. PCT/EP2011/072023, filed on Dec. 7, 2011, which claims priority to European Patent Application No. 11151642.3, filed Jan. 21, 2011, the entire contents of which are being incorporated herein by reference.

FIELD OF THE INVENTION

The field of the invention pertains to a device for conditioning for frothing milk, in particular a milk frother using pressurized gas for frothing milk.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There are also various devices that include a heating and stirring arrangements to heat milk and incorporate air into the milk for frothing the milk. Such devices or similar devices are disclosed in U.S. Pat. No. 2,932,493, U.S. Pat. No. 3,356,349, U.S. Pat. No. 4,537,332, U.S. Pat. No. 4,620,953, U.S. Pat. No. 6,712,497, U.S. Pat. No. 6,318,247, WO 01/26520, WO 2004/043213, WO 2006/050900, WO 2008/046837, WO 2008/142154, WO 2009/074555, DE 1 131 372, DE 196 24 648, DE 89 15 094, EP 1 725 124, EP 1 746 920, EP 1 878 368.

It is also known to use a steam generator, with or without a mechanical stirring device to heat and incorporate fine bubbles into milk for frothing. Examples of such technology are disclosed in EP 1 223 839, EP 1 716 796, EP 1 733 663, EP 2 047 779, EP 2 098 145, 2 153 759, WO 2010/023312 and WO 2010/023313.

It is known to froth milk by injecting pulsed compressed air and vapour into a body of milk, as disclosed in EP 1 776 905. Other compressed air injection systems are disclosed in EP 2 070 455 and DE 44 45 436.

Furthermore, there are milk frothing devices that are arranged to force milk through small-sized channels, as disclosed in DE 197 19 784. Similar principles are disclosed in U.S. Pat. No. 4,144,293.

There is still a need to provide a simple system for generating high quality milk froth.

SUMMARY OF THE INVENTION

The invention thus relates to a milk frothing device comprising a milk reservoir, a supply arrangement of pressurized gas, a delimited area for mixing milk from the milk reservoir and gas, and an arrangement for driving milk from the milk reservoir to the mixing area.

In accordance with the invention, the pressurized gas supply arrangement has a propelling gas conduit configured to deliver pressurized propelling gas into the milk reservoir to pressurize the reservoir and propel thereby pressurized milk in the reservoir therefrom to the mixing area.

The milk frothing device thus has an arrangement for driving milk from a reservoir to an area for mixing the milk with gas to form froth bubbles in the milk. This milk driving arrangement does not require the energy from the gas that is mixed with the milk for frothing, e.g. unlike usual venturi-type devices which use the velocity of steam or air to drive the milk into the mixing area and then be frothed with the same steam or air. Moreover, by providing a source of pressurized gas for driving the milk, e.g. via a pump or from a compressed gas tank, it is possible to froth milk using only such gas, e.g. cold gas or unheated, so that it is possible impart sufficient energy to the driven milk so as to produce cold froth without involving vapour heat or another heat source. By using a driving gas that pressurizes the milk to drive the milk to the mixing area, instead of relying e.g. on a venturi-type milk aspiration mechanism, it is possible to impart a sufficient pressure and/or velocity to the milk driven to the mixing chamber so that mechanical systems, in particular passive systems, can be used to assist formation of gas bubbles in the milk or refine gas bubbles, e.g. by using a static mixer or sieve through which the milk is forced.

Typically, the milk frothing device has an injection gas conduit in fluid communication with the mixing area for injecting gas into milk in the mixing area, the injection gas conduit may be in fluid communication with the pressurised gas supply arrangement for injecting pressurised gas into milk in the mixing area. Hence, a first flow of pressurized gas may be used to pressurize and propel milk from the reservoir to the mixing area and a second flow of pressurized gas, typically originating from the same pressurized supply arrangement, may be used to be injected into the milk in the mixing area for forming gas bubbles in the milk. The injection gas conduit may be a simple air inlet for guiding air from outside the milk frothing device, e.g. from the environment, to the mixing area, typically without any intermediate active air pressurization means.

In a particular embodiment, the device comprises a gas circuit that comprises: a pressurised gas supply arrangement; and an injection gas conduit in fluid communication with the pressurised gas supply arrangement and the mixing area for injecting pressurised gas into milk in the mixing area. In this embodiment, the gas circuit further comprises a propelling gas conduit in fluid communication with the pressurised gas supply arrangement and a milk reservoir for guiding pressurised gas into said milk reservoir and driving milk from the reservoir to the mixing area where pressurised gas is injected via the injection gas conduit into said milk.

Typically, the milk frothing device has a heating arrangement for heating the milk, such as a heater for heating the milk in the reservoir and/or an in-line heater for heating said milk in-line when propelled to said mixing area. To allow the formation of cold frothed milk the heating arrangement may be deactivated for a cold frothing process.

Such heater may be a resistive and/or inductive heater or a heat exchanger or a source of steam, or a combination thereof. The heater may be an in-line flow-through and/or a reservoir heater. For example, the heater may be arranged to circulate a heated fluid, such as steam or water or another heated gas or liquid, in a circuit adjacent to the milk, whereby heat is passed from the heated fluid to the milk e.g. without incorporation of the heated fluid into the milk. The heater may be associated with a wall of the reservoir or with a milk conduit extending from the reservoir to the mixing area. The heater may include a hot fluid injector to injected heated fluid into the milk, in particular hot gas such as vapour and/or said pressurized gas upon heating, e.g. generated by a machine for preparing coffee and/or other beverages or by the milk frothing device itself.

The heating arrangement can be arranged to heat prior to injection the pressurised gas that is then injected into the milk via the injection gas conduit. Hence, the gas injected into the milk can be used to heat the milk in addition to forming bubbles in the milk. The heating gas may be more or less dry, e.g. ambient air or compressed $CO_2$, instead of steam-based as in prior art frothing devices. The heating of such gas may be electric or combustion-based or the gas may even be combustion generated, e.g. for autonomous and/or open-air use of the milk frothing device.

The heating arrangement may be arranged to inject hot fluid, e.g. gas such as vapour, into the milk before or after injection of the pressurised gas into the milk. Incorporation of a heating fluid into the milk separately to the pressurized gas injection may be desirable to adjust the heating relative to the pressurized gas injection. This is for example the case when the desired heat incorporation into the milk exceeds the amount of heat that could be incorporated into the pressurised injection gas without adverse consequences. Such adverse consequences to be avoided may result from a heat incorporation into the pressurised injection gas that would necessitate gas at such a temperature, e.g. above 80 or 90 or 100° C., that would overheat or even burn surrounding milk at incorporation.

The milk frothing device typically comprises a frothing arrangement having at least one of: a static mixer, such as a sieve; a dynamic mixer, such as a rotatable whisk; and a venturi-arrangement. The frothing arrangement may form the mixing area or be located down-flow the mixing area. Static mixers are well known in the field of pharmaceutical, chemical and food industry for mixing fluids, i.e. liquids and/or gases. The mixing effect is achieved by circulating the fluids to be mixed through an element static relative to the moving fluid. The static element, e.g. a three-dimensional mesh-type element, forms and obstacle in the flow of fluid that is forces through and/or along the element and thus promotes mixing of the fluids. Static mixers are for instance manufactured by Sulzer Chemtech®, Komax®, Mordson EFD® StaMixCo®.

The pressurised gas supply arrangement may include a pump for pressurizing the gas, such as air, such pump being in particular configured to draw gas at atmospheric pressure. The pressurised gas supply arrangement can include a pressurized gas tank, e.g. a $CO_2$ tank or an air tank or another food grade suitable gas.

The pressurised gas supply arrangement may be associated with a regulator, e.g. a valve, for regulating a flow and/or pressure in the injection gas conduit and/or in the propelling gas conduit. The regulator may control the injection gas conduit or the propelling gas conduit. The regulator can be a manually or automatically controlled regulator. The regulator may be an on/off regulator or a variable regulator.

Such a regulator may be coordinated with the supply of pressurized gas and the level of heating (if any) of the milk to adjust the desired characteristics of the produced froth.

The frothing device may include a control unit for controlling at least one of a sensor (e.g. a temperature sensor), a regulator, a heater and a pump. A user-interface may be connected to the control unit to allow a user to choose between different frothing programs, e.g. for generating different types of milk froth, e.g. cold or warm milk froth, firm or flowing milk froth, small or large size bubble milk froth, etc. . . .

The frothing device may have a non-frothing milk preparation mode, in particular a heated non-frothed milk preparation mode, in which no pressurised gas is injected into the milk circulating in the mixing area by the pressurized propelling gas. For instance, the above regulator may be set to prevent circulation of injection gas in the injection gas conduit when propelling gas is passed into the milk reservoir.

The milk frothing device may be made of two parts and/or subassemblies. For instance, the device comprises an active part, such as a part comprising the pressurised gas supply arrangement and optionally one or more electric components, that is mechanically disconnectably connected to an inert part, such as an inert part comprising or forming the milk reservoir. The active technology of the milk frothing device may be maintained in a part of the machine that is separable from and inert part. In particular, the active part can be prevented from exposure to milk during use, and/or the milk in such device is contained in the inert part. In such a configuration, cleaning of the portions of the device exposed to hygienically problematic material, e.g. milk-containing residues, can be simplified: only the inert machine part requires intensive cleaning, for example by using a dishwasher.

For instance, the active part is at least partly incorporated into a machine for preparing a beverage such as coffee, e.g. the source of compressed gas such as a pump and/or a source of heat such as a steamer may be incorporated in the beverage machine and be in fluid communication with the inert part such as a milk reservoir.

The active part may be incorporated in a lid assembly that covers an inert part comprising the milk reservoir.

The milk frothing device may have an exhaust system, e.g. including a valve, for immediate release of pressurized propelling gas from the milk reservoir, in particular at an end of frothing. The exhaust system may give direct fluid communication from inside the reservoir to outside the frothing device, typically the outside environment. Hence, the pressure in the milk reservoir generated by the pressurised propelling gas may be released via the exhaust system within a fraction of a second at the end of frothing instead of being slowly released via the mixing area with a resulting slowly decreasing drive of milk. The control of such an exhaust system, e.g. of a release valve, can be associated to the pressurized gas source, namely when the source ceases to supply pressurized propelling gas to the milk reservoir the exhaust system immediately releases pressure from the milk reservoir to end driving milk from the reservoir.

The milk frothing device may have a standalone operative configuration for frothing milk and have an external and/or internal power source. For instance, the milk frothing device is connected by an electric cord or other connector, such as a STRIX® connector, to the mains or to the powering circuit of another machine such as a beverage preparation machine, in particular a coffee machine. The milk frothing device can be powered by batteries.

The milk frothing device may thus have an accessory operative configuration. In particular, the frothing device has an operative configuration in fluid connection with a milk reservoir and/or a machine for preparing a beverage such as a coffee machine. The accessory operative configuration may have at least part of a distant fluid system, e.g. compressed gas source, and/or a distant control arrangement, e.g. the milk frothing device may be controlled via the beverage machine to which it is connected. Hence, a combined beverage preparation involving dispensing a first beverage from the beverage machine, e.g. coffee, and frothed milk from the milk frothing device, may be prepared in an automatically machine-coordinated manner.

For instance, the machine is a coffee, tea and/or soup preparation machine connectable to the milk frothing device. In particular, the machine is arranged for preparing within the beverage preparation module a beverage by passing hot or cold water or another liquid through a capsule containing an ingredient, e.g. a flavouring ingredient, of the beverage to be prepared, such as ground coffee or tea or chocolate or cacao or milk powder. Typically, such a beverage ingredient is supplied into the machine within a capsule.

For the purpose of the present description, a "beverage" is meant to include any human-consumable liquid substance, such as tea, coffee, hot or cold chocolate, milk, soup, baby food, etc. . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

BRIEF DESCRIPTION OF THE DRAWINGS

The invention will now be described with reference to the schematic drawings, wherein.

DETAILED DESCRIPTION

Figure 1:
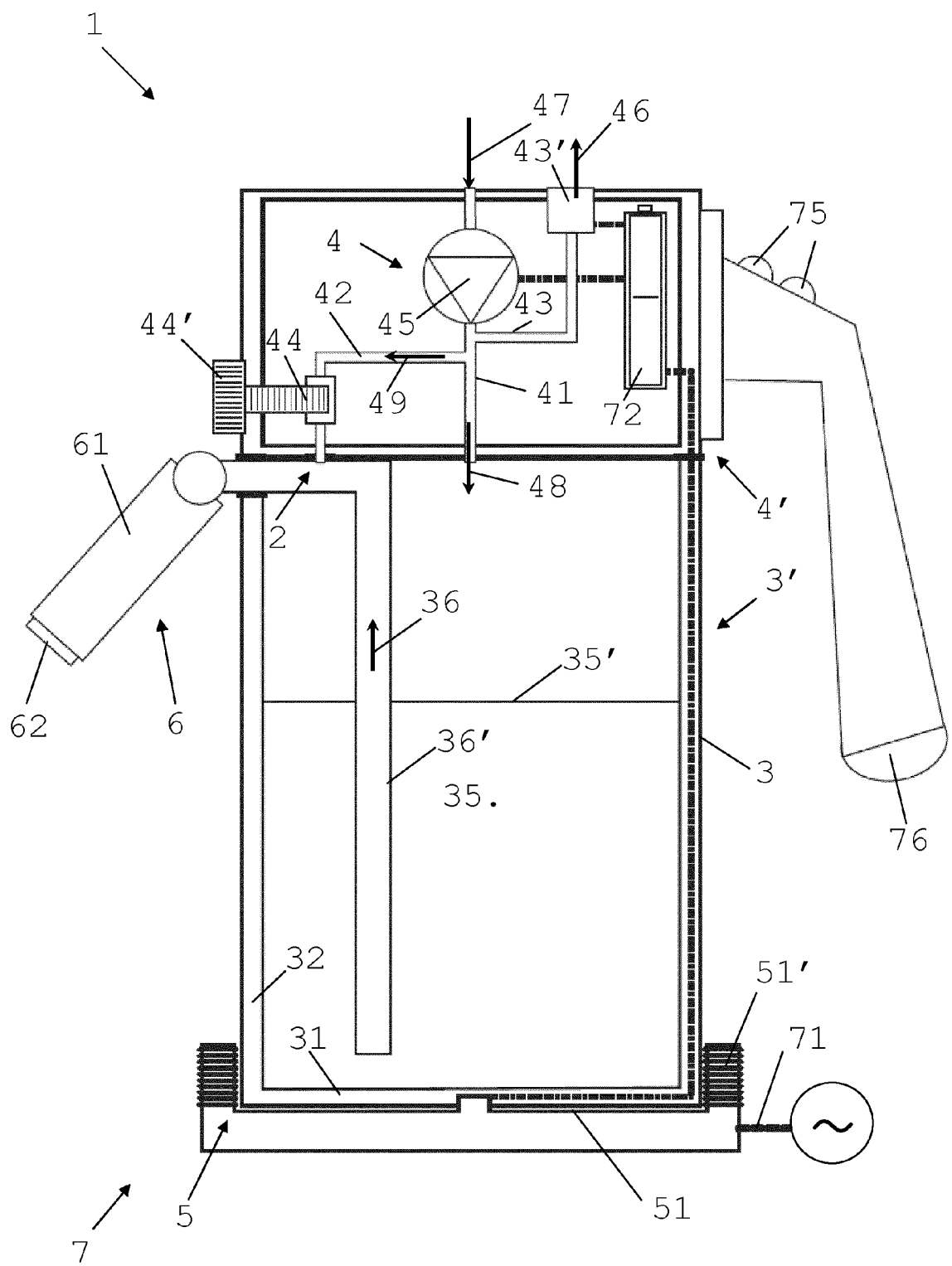
FIG. 1 schematically illustrates a standalone portable milk frothing device according to the invention.
Figure 2:
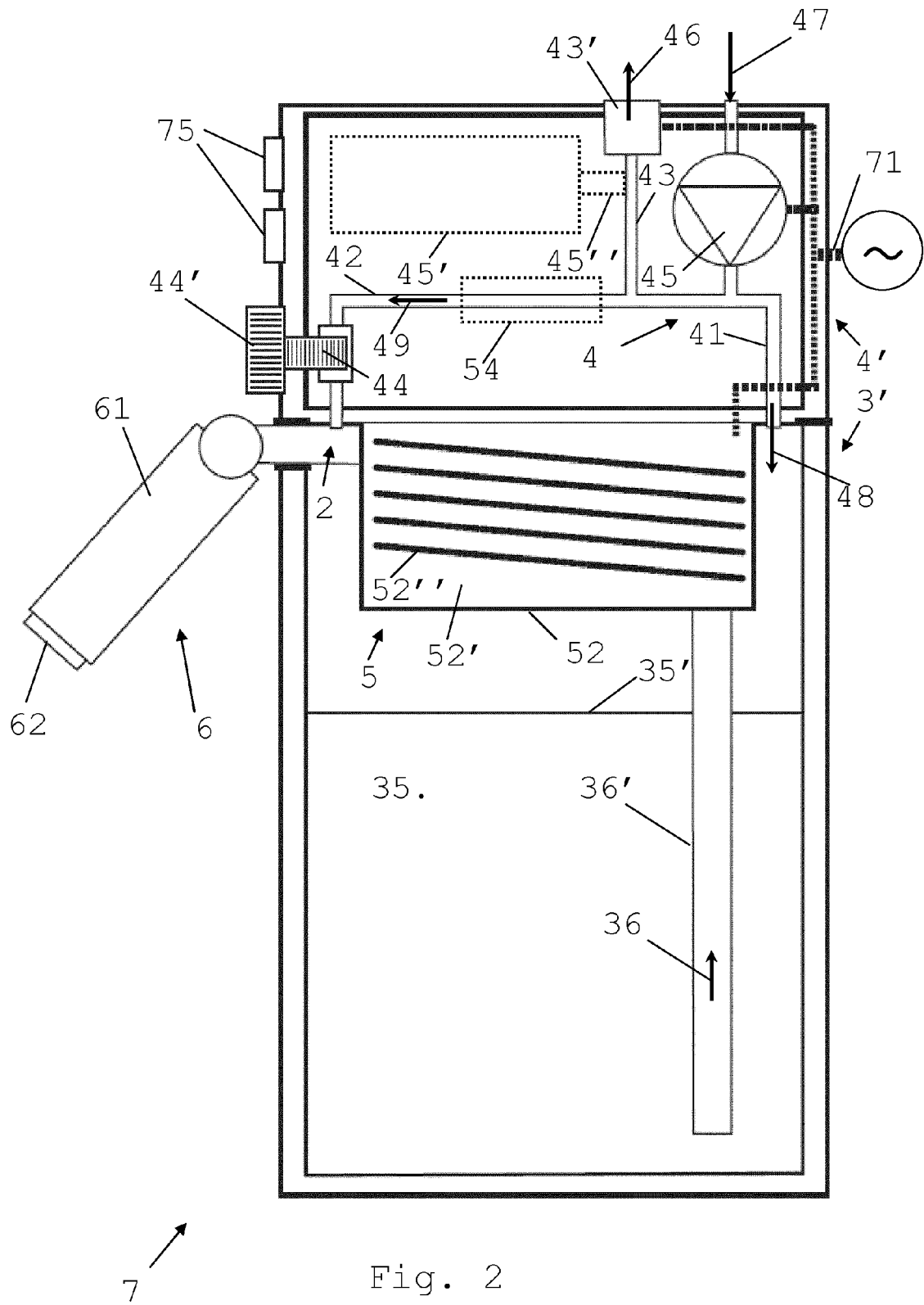
FIG. 2 schematically shows another standalone milk frothing device that can be powered by the mains according to the invention.
Figure 3:
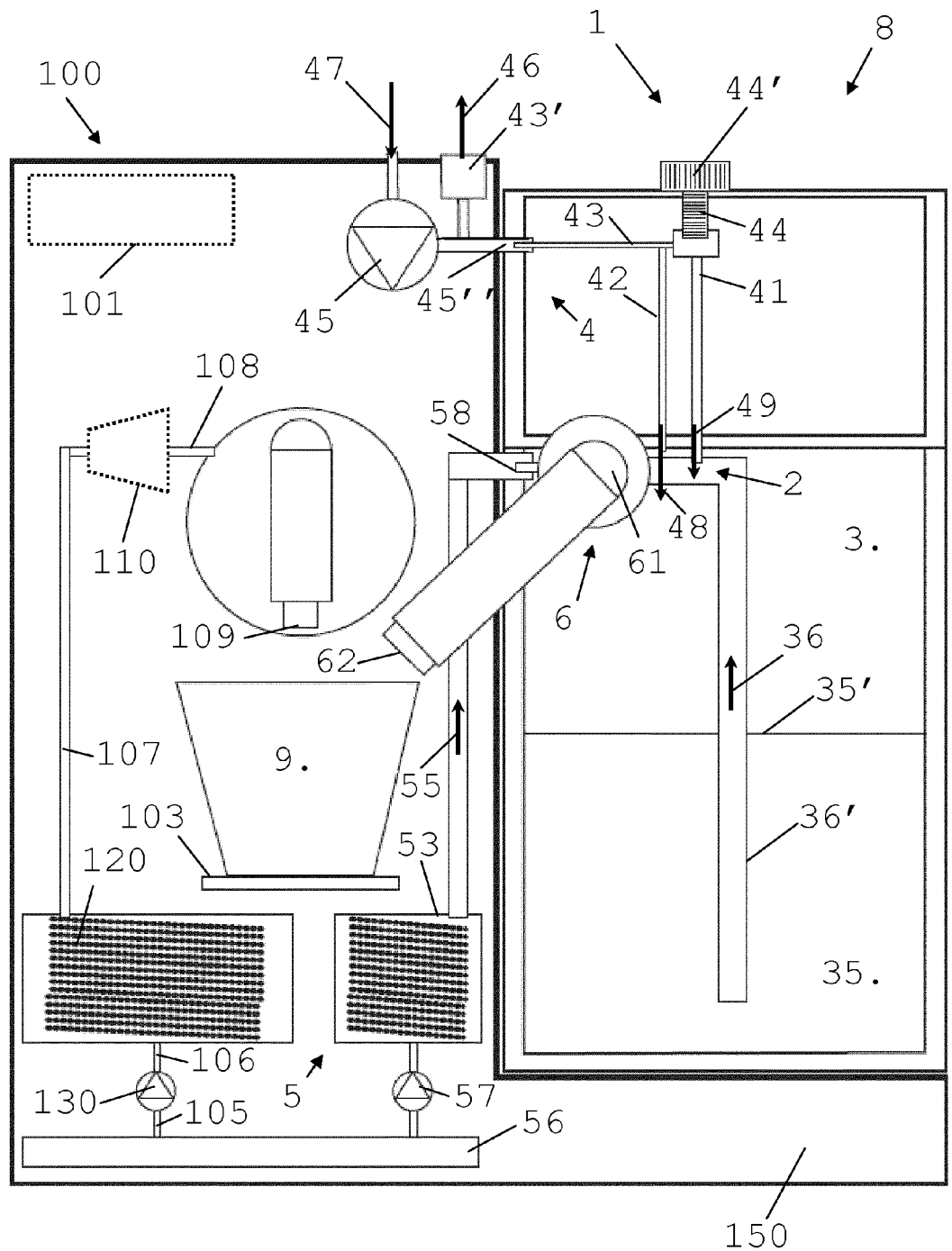
FIG. 3 schematically illustrates a milk frothing device in an accessory configuration according to the invention.

FIGS. 1 to 3 illustrate different embodiments of milk frothing devices 1 according to the invention.

As shown in the appended Figures, frothing device 1 delimits an area 2 for mixing milk 35 from a milk reservoir 3 and gas 49. Device 1 comprises a supply arrangement 4 of pressurized gas 48,49. Such pressurized gas supply arrangement 4 has a propelling gas conduit 41 configured to deliver pressurized propelling gas 48 into milk reservoir 3 to pressurize reservoir 3 and propel thereby pressurized milk 36 from reservoir 3 to mixing area 2. Mixing area 2 may be located inside a milk conduit 36', e.g. a generally tubular element, guiding pressurized milk 36.

Milk 36 may be circulated under pressure at a rate of 100 to 1000 ml/min. e.g. 200 to 600 ml/min. such as 400 to 500 ml/min.

Hence, pressurised gas 48 can act like a gaseous piston on or against the body of milk 35 in reservoir 3.

A gaseous actuation of milk 35,36, e.g. as described above, minimises hygiene problems and resulting cleaning issues, of the driving mechanism of such milk 35,36 for its circulation.

Reservoir 3 and conduit 41 may be so arranged that propelling gas 48 comes into contact with a surface 35' of milk 35, e.g. the milk's upper surface, and pushes milk 35 under pressure into conduit 36' so that milk 36 is driven along conduit 36' to mixing area 2.

Milk frothing device 1 has an injection gas conduit 42 in fluid communication with mixing area 2 for injecting gas 49 into milk 46 in mixing area 2. In particular, injection gas conduit 42 can be in fluid communication with pressurised gas supply arrangement 4 for injecting pressurised gas 49 into milk 46 in the mixing area 2.

Typically, device 1 is an in-line milk frother arranged to mix circulating milk and gas in-line and deliver a resulting milk-gas mixture via an outlet 62.

To produce hot frothed milk, device 1 may include a heating arrangement 5 for heating milk 35,36. Heating arrangement 5 may be activated to deliver hot froth or deactivated to deliver cold froth.

As illustrated in FIG. 1, such as a heater 5 may be arranged to heat the body of milk 35 within reservoir 31. For instance, heater 5 is a heater 51 arranged against a bottom or reservoir 3 and/or a heater 51' extending over one or more walls 31,32 of reservoir 3. Heater 5,51,51' may be resistive, e.g. a think film heater, and/or inductive. In such a configuration, milk 35 accumulated in reservoir 3 can be heated as a batch.

As illustrated in FIGS. 2 and 3, milk 36 may be heated by an in-line heater 52,53,54 for heating circulating milk 36 in-line when propelled to mixing area 2. In this case, only the amount of milk 36 actually used for a particular frothing process can be heated. The remaining milk 35 in reservoir 3 remains unheated by in-line heater 52,53,54.

The in-line and/or batch heater is typically configured to raise the temperature in milk 35,36 from an initial temperature in the range of 0 to 10 or 15° C. to a temperature of 50 to 80° C., such as 55 to 70° C., e.g. about 60 to 65° C. The heating power of the heater is generally in the range of 400 to 1500 W, in particular 500 to 1200 W, e.g. 600 to 1000 W. The heating capacity of the heater will be adjusted to the desired heating speed, in particular when the heating is achieved in-line.

In FIG. 2, in-line heater 52 is associated with milk conduit 36'. Heater 52 may be mounted around conduit 36' is optionally separable therefrom, e.g. when device 1 is cleaned by a user. For instance, heater 52 comprises one or more heating resistors that transfer heat via the walls of conduit 36' into milk 36 circulating therein. In a particular embodiment, heater 52 comprises a chamber containing a heating liquid 52' maintained on the outside and along conduit 36' and transferring heat to the inside of conduit 36' without penetration of heating liquid 52' into conduit 36'. Such a heating liquid 52' may be circulated through this chamber of may be stagnant therein. The heating of heating liquid 52' may for example be resistive outside the chamber or inside the chamber, e.g. via a resistor 52".

FIG. 2 illustrates in dotted line a further heating arrangement 54, e.g. an in-line heater for gas, that can be used instead of or in addition to heater 52. Alternatively, e.g. when a tank of compressed gas is used as a pressurised gas supply, such gas may be heated directly in the tank. As a further alternative, the heated pressurised injection gas may be the gaseous product of a combustion process, e.g. hot CO2 obtained by combustion. Heating arrangement 54, e.g. a resistive or combustion heater, is configured to heat pressurized injection gas 49 prior to injection into milk 36 via injection gas conduit 42. Hence, gas 49 such as air or CO2, used for forming froth bubbles in milk 36 may be preheated before injection into milk 36 so as to heat such milk 36 by incorporation thereinto.

FIG. 3 illustrates a further heating arrangement 53 for injecting hot gas 55 into milk 36, downstream the injection of pressurised gas 49, for heating such milk 36. Alternatively, the hot gas may be injected upstream the injection of pressurised gas. This hot gas may be supplied in the form of steam 55 formed by supplying water into a steamer 53. An in-line heater 53, e.g. instant heater or thermoblock, or a batch heater, e.g. a boiler, may be connected to a source of water, such as a water reservoir 56, optionally via a pump 57.

Milk frothing device typically includes a frothing arrangement 6 having at least one of: a static mixer 61, such as a sieve, labyrinth or any other suitable obstacle along the fluid flow; a dynamic mixer, such as a rotatable whisk; and a venturi-arrangement 62. Frothing arrangement 6 is configured to refine, e.g. reduce the size, of bubbles formed in milk 36 resulting from the incorporation of injection gas 49 into milk 36.

Pressurised gas supply arrangement 4 may comprises a pump 45 for pressurizing gas, such as air, and deliver such pressurised gas 48,49. Pump 45 is in particular configured to draw gas 47 at atmospheric pressure, e.g. from outside device 1. Pump 45 may be powered electrically, e.g. from the mains (domestic power supply or city power supply) via an appropriate conduit 71, preferably associated to a control unit and/or an electric regulation circuit. Pump 45 may be operated at 3, 6, 12 or 24 volt to increase the pressure in the gas, i.e. pressurize the gas, typically by 0.1 to 2 bar, such as 0.2 to 1.5 bar, in particular 0.4 to 1.2 bar, such as 0.6 to 1.0 bar, e.g. about 0.8 bar.

As illustrated in dotted lines in FIG. 2, pressurised gas may be supplied from a tank 45' of pressurised gas. Pressurised gas may be delivered via a control valve 45", e.g. controlled by a control unit (not shown).

Pressurised gas supply arrangement 4 can be associated with a regulator 44 for regulating a flow and/or pressure in the injection gas conduit 42 and/or in the propelling gas conduit 41. In particular, regulator 44 can be arranged to divide the pressurised gas between a flow of pressurised injection gas 49 and a flow or pressurised propelling gas 48.

For instance, regulator 44 comprises a regulation valve on injection gas conduit 42 and/or on the propelling gas conduit.

To prevent frothing of circulating milk 46, regulator 44, in particular located on injection gas conduit 42, may be set to interrupt circulation of injection gas to mixing area 2.

Regulator 44 can be a manually or automatically controlled valve. Regulator 44 that is illustrated in FIGS. 1 to 3 has a hand and/or finger seizable part 44', in particular provided with a grip arrangement, such as a surface structure or composition for example an anti-skid surface, that provides friction against a human hand or fingers to reduce the necessary gripping force needed to achieve a reliable seizure by a user.

Milk frothing device may be made of an active part 4', such as a part comprising the pressurised gas supply arrangement 4 and optionally one or more electric components e.g. pump 45, battery 72, user-interface such as control buttons 75. Such active part 4' can be mechanically disconnectably connected to an inert part 3', such as an inert part comprising or forming the milk reservoir 3.

In particular, active part 4' can be prevented from exposure to milk 35,36 during use and/or milk 35,36 in such device 1 is contained in the inert part 3'.

As shown in FIGS. 1 an 2, active part 4' can be incorporated in a lid assembly which covers inert part 3' that comprises milk reservoir 3.

As illustrated in FIG. 3, active part 4' may be at least partly incorporated into a machine 100 for preparing a beverage such as coffee.

Hence, milk frothing device 1 can be easily serviced or cleaned since only inert part 3 is exposed to milk 35,36. It follows that inert part 3 may be immersed into a cleaning liquid and/or cleaned in a dishwasher without exposing the active part to damaging exposure by cleaning agents, e.g. cleaning fluids. In this case, inert part 3 will be made of materials that are resistant to the cleaning agents used for cleaning.

Milk frothing device 1 may include an exhaust system 43,43' for immediate release 46 of pressurized propelling gas 48 from milk reservoir 3, in particular at an end of frothing. Exhaust system may include an exhaust gas line 43 and a vale 43' controlling evacuation of gas 46.

As illustrated in FIGS. 1 and 2, milk frothing device 1 may have a standalone operative configuration 7. Device 1 may have a connection 71, e.g. an electric cord, to an external power source such as the mains.

Device 1 may have an internal power source 72, e.g. a battery. Device 1 may combine an internal power source 72, e.g. to control frothing process, and an external power source 71 to preheat milk 35. Hence, milk may be preheated by using energy from an external power source and then frothed by using energy from the internal power source 72, in particular disconnected from the external power source. Internal power source may be a rechargeable accumulator, e.g. that can be recharged while device 1 is connected to the external power source.

Milk frothing device 1 may have a handle 76, e.g. bearing user-interface 75. In particular a standalone and/or portable device 1 can be fitted with a handle 76.

As illustrated in FIG. 3, milk frothing device 1 may have an accessory operative configuration 8. Frothing device 1 may be connected to an external machine that provides some of the functionalities necessary for the frothing of milk 35,36 in device 1. In particular device 1 may have an operative configuration 8 in fluid connection with an external milk reservoir and/or a machine 100 for preparing a beverage such as a coffee machine. In particular, the accessory operative configuration 8 includes a remote control arrangement 101. For example, the frothing operation in milk frothing device 1 may be controlled remotely by a user from a user-interface 101 of beverage machine 100.

Beverage machine 100 may include a pump 45 for driving gas 47 from a source, e.g. air from the environment, and pressurising such gas to generate pressurised propelling gas 48 and/or pressurised injection gas 49. A gas connection may bring pump 45 in beverage machine 100 into fluid communication with pressurised gas supply 4 in frothing device 1. An outlet conduit 45" of pump 45 may in particular be connected to gas conduits 41 and 42.

Beverage machine 100 may further include heat source 53,55,56,57 for heating milk 36. Exhaust valve 43' may be provided in beverage machine 100.

Hence, all sensitive parts of milk frothing device 1, electric parts and parts that should not be exposed to milk 35,36 may be shielded in a separable active part 4' and/or in an external machine 100, e.g. externalising part or all hygienically sensitive parts or electrically powered parts of milk frothing device 1 to an area which is not exposed to milk 35,36. This greatly simplifies maintenance and/or cleaning of milk frothing device 1.

As illustrated in FIG. 3, beverage preparation machine 100 typically includes one or more of the following components:
a) ingredient holder 110 (indicated in dotted lines), such as a brewing unit, for receiving the flavouring ingredient of this beverage, in particular a pre-portioned ingredient supplied within a capsule, and for guiding an incoming flow of liquid, such as water, through this ingredient to a beverage outlet 109;
b) an in-line heater 120, such as a thermoblock, for heating this flow of liquid to be supplied to ingredient holder 110;
c) a pump 130 for pumping this liquid through in-line heater 120;
d) one or more fluid connecting members 105,106,107,108 for guiding this liquid from a source of liquid 56, such as a tank of liquid, to beverage outlet 109;

e) an electric control unit (not shown), in particular comprising a printed circuit board (PCB), for receiving instructions from a user via interface 101 and for controlling in-line heater 120 and pump 130; and
f) one or more electric sensors (not shown) for sensing at least one operational characteristic selected from characteristics of ingredient holder 110, in-line heater 120, pump 130, liquid reservoir 56, an ingredient collector (not shown), a flow of this liquid, a pressure of this liquid and a temperature of this liquid, and for communicating such characteristic (s) to the control unit.

The heater may be a thermoblock or an on demand heater (ODH), for instance an ODH type disclosed in EP 1 253 844, EP 1 380 243 and EP 1 809 151.

Examples of suitable brewing units 110 and ingredient capsule management are for example disclosed in WO 2005/004683, WO2007/135136 and WO 2009/043630, which are hereby incorporated by way of reference. Suitable beverage preparation modules for machine 1 are for instance disclosed in WO 2009/074550 and WO 2009/130099 which are hereby incorporated by way of reference.

Beverage machine 100 may have a base 150 or other support structure for supporting milk frothing device 1.

Machine 100 can have a hot gas connector 58 for delivering hot gas 55 into milk frothing device 1 when connected thereto.

Machine 100 may have a gas connector 45" for delivering pressurized gas to device 1, e.g. generated by pump 45 that pressurizes ambient air 47, and/or for guiding exhaust gas 46 to release valve 43' from reservoir 3.

Moreover, machine 100 may have a cup support 103, e.g. of the type disclosed in EP 1 867 260, for supporting a cup 9 under beverage outlet 109 and/or under outlet 62 for dispensing frothed milk. In particular cup support 103 is arranged so that cup 9 is positionable to collect beverage from outlet 109 and frothed milk from outlet 62 without having to displace cup 9 under outlets 62,109. Outlet 62 and/or outlet 109 may be movable to be appropriately positionable over cup 9 and/or away therefrom. For instance, outlet 62 is pivotable over cup 62, as shown in FIG. 3, and away therefrom e.g. downwards or upwards.

The invention claimed is:

1. A milk frothing device comprising:
a milk reservoir;
a supply of pressurized gas;
a mixing area for mixing milk from the milk reservoir and gas;
an injection gas conduit in fluid communication with the mixing area for injecting gas into milk in the mixing area;
a milk conduit that is tubular and extends from an interior of the milk reservoir to an exterior of the milk reservoir, the mixing area located inside the milk conduit;
a pressurized gas supply arrangement for driving milk from the milk reservoir to the mixing area,
the pressurized gas supply arrangement has a propelling gas conduit that extends into the interior of the milk reservoir and is configured to deliver pressurized propelling gas therein to pressurize the reservoir and propel pressurized milk from the reservoir to the mixing area; and
an in-line heater so constructed and arranged as to heat in-line only the pressurized milk propelled to the mixing area, with the remaining milk in the milk reservoir being unheated by the in-line heater.

2. The device of claim 1, wherein the injection gas conduit is in fluid communication with the pressurised gas supply arrangement for injecting pressurised gas into milk in the mixing area.

3. The device of claim 1, which comprises a frothing arrangement having at least one component selected from the group consisting of: a static mixer; a dynamic mixer; and a venturi-arrangement.

4. The device of claim 1, wherein the pressurised gas supply arrangement comprises a pump for pressurizing the gas.

5. The device of claim 1, wherein the pressurised gas supply arrangement comprises a pressurized gas tank.

6. The device of claim 1, wherein the pressurised gas supply arrangement is associated with a regulator for regulating a flow or pressure in at least one gas conduit selected from the group consisting of the injection gas conduit and the propelling gas conduit.

7. The device of claim 6, wherein the regulator comprises a regulation valve on the injection gas conduit.

8. The device of claim 1, which has a non-frothing milk preparation mode in which no pressurised gas is injected into the milk circulating in the mixing area by the pressurized propelling gas.

9. The device of claim 1, which comprises an active part that is mechanically disconnectably connected to an inert part.

10. The device of claim 1, which comprises an exhaust system for immediate release of pressurized propelling gas from the milk reservoir.

11. The device of claim 1, which has a standalone operative configuration for frothing milk and has a connection to an external power source or has internal power source.

12. The device of claim 1, which has an accessory operative configuration.

13. The device of claim 1, wherein the propelling gas conduit and the injection gas conduit are in fluid communication such that the gas provided by the propelling gas conduit and the gas provided by the injection gas conduit originate from the same pressurized gas supply.

14. The device of claim 4, wherein the pump is configured to draw gas at atmospheric pressure.

15. The device of claim 7, wherein the regulation valve is a manually or automatically controlled valve.

16. The device of claim 8, wherein the non-frothing milk preparation mode is a heated non-froth milk preparation mode.

17. The device of claim 10, wherein the release of pressurized propelling gas occurs at an end of frothing.

18. The device of claim 12, wherein the accessory operative configuration is an operative configuration in fluid connection with a milk reservoir or a machine for preparing a beverage.

* * * * *